United States Patent [19]

Rupert et al.

[11] Patent Number: 4,473,669

[45] Date of Patent: Sep. 25, 1984

[54] PHENOLIC POLYOLS AND RIGID CELLULAR COMPOSITIONS DERIVED THEREFROM

[75] Inventors: John P. Rupert, Wadsworth, Ohio; John T. Patton, Jr., Wyandotte, Mich.

[73] Assignee: BASF Wyandotte Corporation, Wyandotte, Mich.

[21] Appl. No.: 581,428

[22] Filed: Feb. 17, 1984

Related U.S. Application Data

[62] Division of Ser. No. 458,283, Jan. 17, 1983, Pat. No. 4,448,951.

[51] Int. Cl.$^3$ .................. C08G 18/00; C08G 8/36
[52] U.S. Cl. ............................... 521/177; 521/124; 521/125; 521/127; 521/902; 528/129; 528/139; 528/140; 528/154
[58] Field of Search ............... 521/177, 124, 125, 127; 528/129, 139, 140, 154

[56] References Cited

U.S. PATENT DOCUMENTS

| | | | |
|---|---|---|---|
| 3,661,814 | 5/1972 | Smith et al. | 528/129 |
| 3,674,732 | 7/1972 | Pitzodis et al. | 528/139 |
| 4,120,847 | 10/1978 | Culbertson | 528/140 |
| 4,390,641 | 6/1983 | Smith | 521/177 |

FOREIGN PATENT DOCUMENTS 2033413 5/1980 United Kingdom .

Primary Examiner—Morton Foelak
Attorney, Agent, or Firm—Joseph D. Michaels

[57] ABSTRACT

Modified benzyl ether-containing resole polyols derived from phenol, paraformaldehyde and an aliphatic hydroxyl compound are prepared using a metal derivative as a catalyst. These polyols react with organic polyisocyanates to yield closed cell, low friability, low combustibility, rigid polyurethane foams without the need for post curing at elevated temperature. They are also useful in the preparation of modified rigid polyisocyanurate foams.

4 Claims, No Drawings

PHENOLIC POLYOLS AND RIGID CELLULAR COMPOSITIONS DERIVED THEREFROM

This is a division of application Ser. No. 458,283, filed Jan. 17, 1983 now U.S. Pat. No. 4,448,951.

BACKGROUND OF THE INVENTION

1. Field of the Invention

This invention relates to phenol/aldehyde-based polyols and to rigid cellular compositions derived from these polyols. Specifically it deals with modified benzylic ether-containing resole polyols and the rapid curing, low combustibility, low friability, closed cell, rigid cellular plastic compositions obtained by reaction of the polyols with polyisocyanates.

2. Description of the Prior Art

Simple phenolic foams obtained by the thermal and acid catalyzed polymerization of resole resins or of novolac resins with added aldehydic compounds are old in the art. Such foams are noted particularly for their excellent fire resistance. However, they also possess the properties of punking, extreme friability, and being opened-cell which make them ill-suited for insulation or any use where the foam must be handled or support weight. There is a long-established desire to use such phenolic resins in cellular polyurethane or polyisocyanurate formations with the hope of improving strength, insulation, and punking properties while retaining the inherent low combustibility of phenolic foams.

In the art of phenol/aldehyde condensates, it is known that the properties and structures of the products vary, primarily dependent on the phenol/aldehyde mole ratio and the type of catalysis used for the condensation. Alkaline catalysis (alkaline hydroxide, organic amines) with aldehyde in excess results in products known as "resoles" having the following idealized formula:

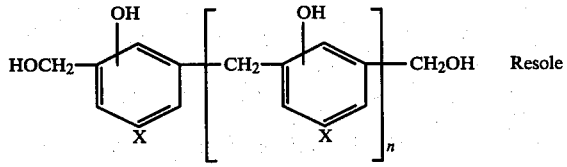

where X is H or —CH$_2$OH and n=0, 1, 2, 3, or higher.

The hydroxymethyl ring substituents of the above "resole" are highly reactive toward unsubstituted ortho or para phenolic ring positions. Thus, such condensates can be easily cross-linked to form infusible solids by heating or acidifying. Acid catalysis is not normally used in the preparation of resoles since cross-linking leading to gelation can easily occur.

When the phenol is used in molar excess, the product has little or no hydroxymethyl substitution as shown in the following idealized formula:

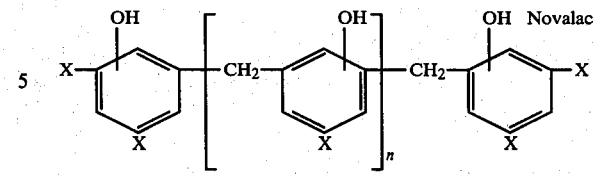

where X is hydrogen and n=0, 1, 2, 3, or higher.

Such products are called "novolacs" and, lacking the reactive hydroxymethyl substituent, can be prepared under acid catalysis to benefit from a faster rate of formation. In all phenol/aldehyde condensates (novolacs and resoles) small quantities of starting materials and intermediates are present.

A British study (Fraser, et al, J. Appl. Chem. 7 689 (1957) showed that electropositive divalent metal ions which also catalyze the phenol/aldehyde condensation, cause (1) the substitution on the phenol ring to occur predominantly in the ortho rather than the para position and (2) results in the formation of a high percentage of benzylic ether linkage in addition to some methylene linkages between phenol rings. This is illustrated in the following formula:

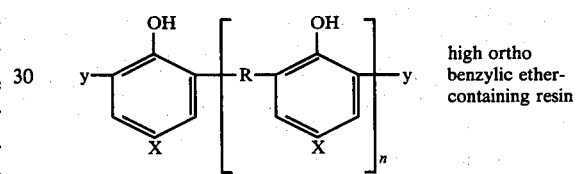

where
R is —CH$_2$OCH$_2$—or a mixture of —CH$_2$—OCH$_2$— and —CH$_2$—
X is H
y is H or —CH$_2$OH and
n=1, 2, 3, or higher.

The differences between these three types of phenol/aldehyde condensates is demonstrated in their conversion to highly cross-linked infusible phenolic polymers. Resoles, containing an abundance of reactive hydroxymethyl groups and available unsubstituted ring positions, react when heated alone. Novolac, having no significant amount of hydroxymethyl groups, must be heated with an aldehyde source (hexamethylene tetraamine or paraformaldehyde) to undergo cross-linking reaction. The benzylic ether-containing resin will cross-link at a slow rate as the benzylic ether linkage decomposes (at 150° C. and higher temperature) to form methylene bridges and liberate formaldehyde which serves to cross-link the resin. Thus, the stuructural differences between novolacs, resoles, and benzyl ether-containing resins are reflected in and explain the known differences in chemical behavior of these different phenol/aldehyde condensates.

The use of benzylic ether-containing resins in the preparation of polyurethanes has been disclosed in Japanese Pat. No. 1973-43,097 (to Hatashi Chemical Industries) and U.S. Pat. 3,948,824 (to Robins). The benzylic ether resoles use by Robins were prepared according to U.S. Pat. No. 3,485,797. While these patents represented novel improvements over the then existing art, the polyurethane foams obtained by the teaching of these patents have been found both in our laboratories and by others to be deficient in one or more properties (see Example 2 hereinafter; U.S. Pat. No. 4,293,658; and Scha.er, et al, *J. Cellular Plastics* 1978 p. 147). The polyurethane foams obtained were slow to cure and friable. To achieve desirable strength and friability properties required post-curing of the foams at elevated temperatures.

In Great Britain No. 2,033,413, modified resoles are etherified with aliphatic polyols (under acid conditions) and the products are used to prepare polyurethane or polyisocyanurate foams. However, these phenol-formaldehyde derived resins yielded polyurethanes with poor inherent flammability properties. To obtain suitable flame retardant foams required the use of chlorophenol as the phenolic reactant and/or added phosphate-type flame retardant in the foam formulation.

A seemingly related group of patents have recently issued to Vasishth et al and been assigned to Cor Tech Research Ltd. (U.S. Pat. Nos. 4,235,989; 4,219,634; 4,184,032; 4,140,845). Although the patents disclose and teach the preparation of benzyl ether-containing resins in the presence of methanol, the processes and products differ from the present invention in several important respects. The patents teach the use of aqueous formaldehyde plus added water such that the condensation is carried out in an aqueous system until the resin precipitates as a second phase. Second, the reaction is carried out at a lower temperature, from 90° C. to "approximately 100° C." (reflux). Finally, infrared and NMR spectroscopy reported in the patents did not reveal any "reacted" methanol and the resins were not used as "polyols" in polyurethane formation.

SUMMARY OF THE INVENTION

This invention is a class of modified benzyl ether-containing resole polyols obtained by a process comprising reacting at 100° C. to 130° C. (a) a phenol which is free of ortho substituents, (b) a molar excess relative to the phenol of a nonaqeous aldehyde having the formula RCHO where R is hydrogen, an alkyl group of 1 to 6 carbon atoms, or a halogenated alkyl group of 1 to 3 carbon atoms, and (c) less than fifty mole percent relative to the phenol of an aliphatic hydroxyl compound having 1 to 4 hydroxyl groups, 1 to 12 carbon atoms, and 0 to 5 ether oxygen atoms in the presence of a catalytic amount of a metal derivative selected from the group consisting of (i) carboxylate salts of divalent ions of Mn, Zn, Cd, Mg, Co, Ni, Fe, Pb, Ca, Ba, and (di $C_1$–$C_5$ alkyltin) where the carboxylate ions each contains 1 to 20 carbon atoms, and (ii) $(C_nH_{2n+1})_4$ TiO$_4$ where n is an integer of 3 to 8. These polyols are belieyed to have the following formula:

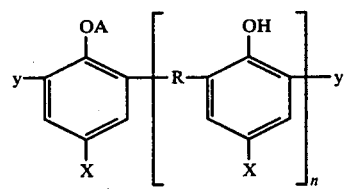

where
n is 1, 2, 3, or a higher integer;
x is H, halogen, $C_1$–$C_{12}$ alkyl or a mixture thereof;
y is a mixture of hydrogen and –CH$_2$OA;
A is a mixture of hydrogen and a radical or mixture of radicals resulting from removal of a hydroxyl group from an aliphatic hydroxyl compound or mixture of compounds having 1 to 4 hydroxyl groups, 1 to 12 carbon atoms and 0 to 5 ether oxygen atoms;
R is —CH$_2$OCH$_2$— or a mixture of —CH$_2$OCH$_2$— and —CH$_2$— with the ratio of 13 CH$_2$·OCH$_2$— groups to —CH$_2$— groups being greater than 1; and wherein the amount of substituent radical A is at least 5 mole percent but less than 35 mole percent of the phenol rings present.

The polyols are especially suited for reaction with organic polyisocyanates to yield low combustibility, low friability, closed-cell, rigid cellular plastics. The polyurethane foams are rapid curing and do not require post curing to achieve excellent physical properties.

DESCRIPTION OF THE PREFERRED EMBODIMENTS

The modified benzyl ether-containing resole polyols of this invention are prepared by the metal salt or titanate ester catalyzed reaction of a phenol with a molar excess of a nonaqueous aldehyde and a modifying amount of a mono- or polyhydroxyl compound.

The general procedure for the production of these polyols is to charge the phenol, nonaqueous aldehyde, catalyst, and modifying hydroxyl compound to a stirred reactor fitted with a condenser system which is suitable for either reflux or distillate removal. The stirred mixture is heated rapidly to about 100° C. to 105° C. at which point a slight exotherm occurs. The mixture is maintained at 110° C. to 115° C. for several hours under slow reflux. The reaction temperature is then increased to approximately 120° C. and the distillate (essentially water) removed. After the desired amount of water, which is indicative of the desired degree of phenol/aldehyde/hydroxyl compound condensation, is collected, the mixture is cooled to about 60° C. and stripped at reduced pressure to further reduce the water content to less than three, preferably less than one weight percent of the polyol. No effort is made to neutralize or remove residual catalyst which remains in the product.

The desired phenol/aldehyde condensate is one possessing hydroxymethyl substituents and, therefore, use of a molar excess of aldehyde is indicated. The useful mole ratio is from 1.1 mole to 2.25 moles of aldehyde per mole of phenol. When the mole ratio falls below 0.9, the condensate becomes more "novolac" in structure (lacking hydroxymethyl substituents) and as the mole ratio approaches three, more para substitution and/or cross-linking occurs. The preferred mole ratios of aldehyde to phenol range from 1.2 to 1.8.

The amount of modifying hydroxyl compound used is governed by the amount required to achieve improvement in the normal high friability and opened cell structure of phenolic foams and limited by the amount which would obviate the fire resistance of the phenolic structure. Below about one mole percent of hydroxyl compound based on the amount of phenol used, the hydroxyl compound is ineffective in improving strength and friability properties. Above 50 mole percent on the same basis, the hydroxyl compound causes the loss of the inherent fire retardancy of the phenolic structure. Thus, a useful range of hydroxyl compound is 1 to 50 mole percent of the phenol compound used. The preferred range is 10 to 25 mole percent.

Metal derivatives are effective as catalysts at concentration of 0.01 to 0.10 weight percent metal based on the total change. The preferred catalyst level is 0.04 to 0.07 weight percent metal.

No solvent is needed for this reaction. Although certain solvents can be used as entrainment agents to facilitate the removal of water, we have found this to be unnecessary. Water is easily removed essentially as it forms simply by maintaining the reaction mixture at or above a temperature of 120° C.

Phenols which are suitable for use in the preparation of these products are those which are unsubstituted in the ortho positions but which may be substututited in the meta or para positions with halogen, $C_1$ to $C_{12}$ alkyl, or halogen-substituted alkyl of 1 to 6 carbon atoms. Examples of such phenols are phenol, p-cresol, p-tertiarybutylphenol, p-chlorophenol, p-bromophenol, p-trifluoromethylphenol, p-(2,3-dibromopropyl)phenol; 3,5-xylenol; 3,5-dichlrophenol, p-dodecylphenol, p-trichloromethylphenol, p-nonylphenol, as well as mixtures of any of the foregoing. The preferred phenolic reactant is phenol itself or phenol mixed with a minor amount of the aforementioned substituted phenols.

Aldehydes which are suitable for use in the preparation of the polyols of this invention are aliphatic or halogenated aliphatic aldehydes having the formula RCHO where R is hydrogen or alkyl of 1 to 6 carbon atoms, optionally halogenated. Examples of such aldehydes are formaldehyde, acetaldehyde, pivaldehyde, hexanal, chloral, and 2,3-dibromopropanal. The preferred aldehyde is formaldehyde. Preferably the aldehyde is used in a nonaqueous state such as paraformaldehyde, trioxane, paraldehyde, or chloral.

The modifying hydroxyl compound suitable for use in the preparation of the polyols of this invention are aliphatic monols, diols, triols, or tetrols having 1 to 12 carbon atoms and 0 to 5 ether oxygen atoms or mixtures thereof. Examples of such hydroxyl compounds are methanol, ethanol, butanol, ethylene glycol, diethylene glycol, propylene glycol, trimethylene glycol, 1,4-butanediol, 2,3-butanediol, 1,3-butanediol, 1,12-dodecanediol, 1,2,5-hexanetriol, trimethylolpropane, pentaerythritol, tripropylene glycol, tetrapropylene glycol, hexaethylene glycol. The preferred class of hydroxyl compounds are the diols, especially 1,4-butanediol and diethylene glycol.

The catalyst used in the preparation of the modified benzylic ether-containing resole polyols of this invention is selected from derivatives of certain metals. These are the $C_1$–$C_{20}$ carboxylic acid salts of the group of divalent metal ions consisting of those of Mg, Ca, Mn, Fe, Co, Ni, Zn, Cd, Ba, and Pb (with or without added PbO); $C_1$–$C_{20}$ carboxylic acid salts of divalent (dialkyltin) where the alkyl groups each contain 1 to 5 carbon atoms; and alkyl (3 to 8 carbon atoms) ortho titanates. Examples of suitable catalysts include lead naphthenate (with or without added PbO), zinc neodecanoate, cobalt naphthenate, tetrabutyl titanate, tetraoctyl titanate, manganese valerate, ferrous lactate, cadmium acetate, zinc benzoate, zinc acetate, dibutyltin dilaurate, dimethyltin diactate, lead butyrate. The preferred catalysts are zinc neodecanoate, lead naphthenate, and dibutyltin dilaurate. The catalyst used in the polyol preparation is not removed or neutralized and remains in the product.

The modified benzyl ether-containing resole polyols prepared with the above indicated preferred materials have viscosities of less than 1,500,000 cps at 25° C. and generally in the range of 5000 to 650,000 cps at 25° C. The hydroxyl number values of the products, determined by the phenyl isocyanate method, generally range from 375 to 675, mostly in the 500 to 600 range.

The rigid cellular compositions derived from these novel polyols are made by state of the art techniques and are "phenolic" containing polymers with superior properties requiring no special treatment or equipment for their manufacture. Thus like any ordinary polyol, they can be reacted with organic polyisocyanates in the presence of the usual urethane catalysts using water or volatile organic blowing agents along with surfactants, plasticizers, fillers, or other additives. Reaction is achieved by intensely mixing the ingredients for a brief period and allowing the mixture to react. The products cure rapidly at room temperature without application of heat. Similarly the polyols can be used in the manufacture of urethane-modified polyisocyanurate foams by using a large molar excess ("high index") of polyisocyanate, a blowing agent, a surfactant, and an isocyanurate catalyst such as potassium acetate or tris(dimethylaminopropyl)hexahydrotriazine.

Suitable polyisocyanates for manufacture of these novel rigid cellular plastics are any organic di- or higher functionality isocyanate which is reactive with Zerewitinoff type hydrogen atoms. Examples of such isocyanates are hexamethylene diisocyanate, 1,3- or 1,4-cyclohexane diisocyanate, 3-isocyanatomethyl-3,5,5-trimethylcyclohexane isocyanate, 2,2'-, 2,4'-, or 4,4'-dicyclohexylmethane diisocyanate, 1,3- or 1,4-bis-(isocyanatomethyl)cyclohexane, m- or p-xylylene diisocyanate, 2,4- or 2,6-toluene diisocyanate, 2- or 4-methyl-1,3-cyclohexane diisocyanate, 1,3,5-tris(6-isocyanatohexyl)isocyanurate, N,N',N''-tris(6-isocyanatohexyl)biuret, 2,2'-, 2,4'- or 4,4'-diphenylmethane diisocyanate, 2,2'-, 2,4'- or 4,4'-diphenyl diisocyanate, 3,3'-dimethyl-2,2'-, 2,4'- or 4,4'-diphenylmethane diisocyanate, bis(4-isocyanatophenyl) ether or sulfide, polyphenyl polymethylene polyisocyanate, or mixtures of any of the aforementioned isocyanates. Aromatic polyisocyanates are preferred and in particular the mixture of diphenylmethane diisocyanate isomers with polyphenyl polymethylene polyisocyanates ("crude MDI") is the isocyanate of choice.

The catalysts used for polyurethane formation are those known in the art and consist of tertiary amines, metal salts, or mixtures thereof. Examples of such suitable catalylic compounds are triethylamine, dimethylaminoethanol, N,N,N',N'-tetraethylethylenediamine, N,N,N',N'-tetramethyl-1,3-butanediamine, bis(dimethylaminoethyl)ether, N,N-dimethyl-3-dimethylaminopropionamide, 1,4-diazo[2.2.2]-bicyclooctane, N-methyl- or ethylmorpholine, stannous oleate, stannous 2-ethylhexanoate, dibutyltin dilaurate, dibutyltin dilauryl mercaptide, dibutyltin diacetate, lead naphthenate, zinc stearate, or mixtures thereof. Amine catalysts are preferred and the most preferred catalyst is diazabicyclooctane.

Blowing agents suitable for use in the preparation of these polyurethanes foams are water (which reacts with the isocyanate to form carbon dioxide) and volatile low boiling organic compounds. Examples of such compounds are alkanes such as pentane or hexane, oxygenated compounds such as methyl formate, halogenated aliphatic compounds such as fluorotrichloromethane or methylene dichloride. The preferred blowing agents are water, methylene dichloride, fluorotrichloromethane (Refrigerant 11), or mixtures thereof.

Suitable surfactants to serve as emulsifying agents or cell stabilizers in the manufacture of these polyurethane foams are alkylarylsulfonates such as sodium didecylbenzenesulfonate, alkali metal or ammonium salts of alcohol sulfates such as potassium lauryl sulfate or ammonium salt of sulfated castor oil, oxyethylated fatty alcohols or acids such as oxyethylated tetradecanol containing 63 percent oxyethylene by weight, or silicone surfactants such as polyalkylsiloxane-polyoxyalkylene block copolymers. The preferred surfactants are the silicone surfactants.

Plasticizers such as tris(chloroethyl) phosphate or didecylphthalate may be incorporated into the foam if desired.

Chain extenders such as low molecular weight diols may be used in quanity of less than 10 percent by weight of the polyol. Such low molecular weight diols can also serve to reduce the polyol viscosity for use in machine foaming.

The foams obtained by the practice of this invention are rapid curing, rigid, closed-cell polyurethanes which show good strength and flammability properties.

The following examples show the preferred embodiments of this invention in greater detail. In the examples, all parts given are by weight unless otherwise specified. The test results reported are based on the following ASTM tests:

Tumb. Friab. = tumbling friability test (C421)
Butler Chimney = combustion test (D3014)
K Factor = thermal insulation test (C518)
10% Comp. Strength = force for 10% compression (D1621)
NBS Smoke = maximum smoke density (E662)

Materials used in foam formulations were:
DC-193—a polyoxyalkylene-polydialkylsiloxane block copolymer sold by Dow Corning Company
F-11A —a stabilized fluorotrichloromethane—a refrigerant sold by DuPont Company
PAPI 135—a polymethylene polyphenylene polyisocyanate/diphenylmethane diisocyanate mixture (functionality of 2.7) sold by Upjohn Company
DABCO R8020—a tertiary amine catalyst consisting of 20 percent diazabicyclooctane and 80 percent dimethylaminoethanol sold by Air Products and Chemicals Company, Houdry Division
POLYCAT 8—N,N-dimethylcyclohexylamine sold by Abbott Laboratories, Chemicals Division
LUPRANATE M20—a polymethylene polyphenylene polyisocyanate/diphenylmethane diisocyanate mixture (functionality of 2.7) sold by BASF Wyandotte Corporation

EXAMPLE 1

Phenol (634.24 parts), 91 percent paraformaldehyde (364.5 parts), 30 parts of 1,4-butanediol, 0.39 parts of PbO, and 0.88 parts of lead naphthenate solution (24 percent Pb) were charged to a reactor fitted with a mechanical stirrer, thermometer, and a reflux condenser/takeoff assembly. The stirred mixture was heated at 110° C. to 116° C. for 2 hours with total reflux and then the distillate was taken off while the mixture was heated to 126° C. to 128° C. When the major portion of the water of reaction had been removed at atmospheric pressure, the pressure was reduced to remove residual water. The stripped resin polyol had a hydroxyl number of 575 mg KOH/g and a water content of 0.5 percent.

COMPARATIVE EXAMPLE A

Following the process of U.S. Pat. No. 3,485,797—Example 1, a state of the art benzylic ether-containing resole polyol was prepared. The charge of reactants was the same as in the above Example 1 except that no butanediol was charged. The preparation was carried out in the same equipment used in Example 1, and the reaction conditions were the same. The stripped resin polyol obtained had a hydroxyl number of 593 and a water content of 1.1 percent.

EXAMPLE 2

The products of the two prior examples were compared in polyurethane behavior by conventional hand foaming methods. This comparison is summarized in Table I which shows the formulation used and the properties of the foams obtained. It is readily apparent that the foam prepared from the polyol of the present invention (Foam 1) is superior to those (Foams A1 and A2) prepared from a polyol of the prior art in friability, flammability, and insulating (closed-cell) properties.

TABLE I

| Foam No. | 1 | A1 | A2 |
|---|---|---|---|
| Polyol of Comp. Ex. A, pbw | — | 100 | 100 |
| Polyol of Example 1, pbw | 100 | — | — |
| DC-193, pbw | 1.4 | 1.4 | 1.0 |
| F-11A, pbw | 51.4 | 51.4 | 42.5 |
| DABCO R8020, pbw | 1.25 | 1.20 | 1.30 |
| PAPI 135 (120 Index), pbw | 169 | 169 | 174.5 |
| Properties of Foam: | | | |
| Density, pcf | 1.55 | 1.69 | 1.86 |
| Tumb. Friability, % wt. chg. | −47.5 | −100 | −79 |
| Butler Chimney Test, % weight retained | 62.4 | 51.8 | 70.6 |
| K-factor, initial | 0.168 | 0.176 | 0.129 |

EXAMPLES 3 and 4

The preparation of benzylic ether resole polyols modified with different levels of 1,4-butanediol and using a different catalyst (zinc neodecanoate -16 percent Zn) is summarized in Table II. The reaction conditions used in these preparations are otherwise the same as described in Example 1. Table II also shows the properties of the polyurethane foam derived from the polyols. It can be readily seen that in comparison with Example 1, the use of higher quantities of butanediol is also effective in reducing friability and improving insulating properties. Note that at the higher level of butanediol (32 mole percent of the phenol) the fire retardance is less than at lower levels.

TABLE II

| Example | 3 | 4 |
|---|---|---|
| Polyol Preparation Charge (pbw): | | |
| Phenol | 650 | 650 |
| Paraformaldehyde (91%) | 356 | 356 |
| Zinc Neodecanoate (16% Zn) | 4.0 | 4.0 |
| 1,4 Butanediol | 100 | 200 |
| Polyol Properties: | | |
| Hydroxyl number | 523 | 434 |
| Water content, % | 0.45 | .6 |
| Foam Formulation (parts/hundred parts polyol): | | |
| DC-193 | 1.0 | 1.0 |
| DABCO R8020 | 1.5 | 1.5 |
| F-11A | 43.2 | 42.7 |
| PAPI 135 (120 Index) | 177.1 | 133.0 |
| Foam Properties: | | |
| Density, pcf | 1.13 | 1.11 |
| Tumb. Friab., % wt. chg. | −1.25 | −0.87 |
| Butler Chimney Test, % wt. retained | 61 | 0 |

TABLE II-continued

| Example | 3 | 4 |
|---|---|---|
| K-Factor, initial | 0.114 | 0.123 | with excellent strength, insulating (low K-factor), and flamability properties. The latter values are slightly reduced due to the nonylphenol used in making the polyol.

TABLE III

| Example | 5 | 6 | 7 | 8 | 9 | 10 | 11 |
|---|---|---|---|---|---|---|---|
| Formaldehyde-Phenol Mole Ratio | 0.90 | 1.10 | 1.33 | 1.55 | 1.73 | 2.00 | 2.25 |
| Polyol Properties: | | | | | | | |
| Viscosity, cps × $10^{-3}$ | 59.6 | 410 | 390 | 250 | 293 | 20.8 | 60.8 |
| Hydroxyl number | 542 | 504 | 476 | 491 | 526 | 537 | 610 |
| Water content, % | 0.11 | 0.63 | 0.24 | 0.39 | 0.44 | 0.20 | 0.12 |
| Foam Formulation: (pbw) | | | | | | | |
| Polyol | 100 | 100* | 100 | 100 | 100 | 100 | 100 |
| DC-193 | 1.0 | 3.0 | 1.0 | 1.0 | 3.0 | 1.50 | 3.0 |
| F-11 | 40.5 | 39.6 | 40.2 | 39.7 | 40.8 | 37.6 | 46.9 |
| DABCO R8020 | 1.0 | 0.5 | 0.7 | 0.5 | 0.5 | 0.5 | 0.5 |
| PAPI 135, Index | 100 | 100 | 100 | 100 | 100 | 80 | 100 |
| Foam Properties: | | | | | | | |
| Density, pcf | 1.66** | 1.79 | 1.81 | 1.82 | 1.76 | 1.97 | 1.78 |
| Tumb. Friab., % weight change | −8.7 | −7.81 | −3.0 | −5.9 | −2.59 | −5.99 | −3.8 |
| Butler Chimney, % weight retained | 73.2 | 67.0 | 60.8 | 62.8 | 63.7 | 69.5 | 60.3 |
| NBS Smoke, $D_m$ | 65 | 122 | 102 | 93 | 101 | 85 | — |
| K-Factor, initial | 0.122 | 0.126 | 0.122 | 0.125 | 0.130 | 0.112 | 0.127 |
| 10% Compression Strength, psi | 33.0 | 32.2 | 33.7 | 32.4 | 33.3 | 32.3 | 31.4 |

*Formulation contains 6 parts added propylene glycol.
**This foam required post-curing at 100° C. for one hour to achieve the properties shown.

EXAMPLE 5-11

The usefulness of this invention over a wide range of formaldehyde-phenol ratios is demonstrated in the series of experiments summarized in Table III. A mixture of phenol (83.0 mole percent) and p-nonylphenol (2.7 mole percent) containing 1,4-butanediol (14.3 mole percent) was reacted in the presence of lead naphthenate catalyst in the manner described above with varied quantities of paraformaldehyde. The properties of the polyols and the polyurethane foams derived therefrom are shown. Throughout the range of formaldehyde-phenol ratios tested, the use of butanediol as a reactant resulted in polyols which yielded polyurethane foams with excellent strength, insulating, and flamability properties.

EXAMPLES 12-19

To demonstrate the variety of low molecular weight hydroxyl compounds which can be used to modify benzylicether containing resole polyols, the procedure of Example 1 was repeated with different added hydroxyl compounds and varied catalysts as shown in Table IV. The added hydroxyl compounds were used in an amount ranging from 9.7 mole percent (triethylene glycol) to 19.0 mole percent (1,2-propanediol) based on the phenol used. Each of these modifiers yield a resole polyol having an acceptable viscosity and hydroxy number. Each resole polyol was used (Table V) to prepare a polyurethane foam with good friability, flamability, and insulating properties.

TABLE IV

| Example | 12 | 13 | 14 | 15 | 16 | 17 | 18 | 19 |
|---|---|---|---|---|---|---|---|---|
| Phenol/formaldehyde charge,* (pbw) | 90.8 | 90.9 | 90.8 | 90.8 | 90.8 | 90.2 | 90.2 | 90.2 |
| Hydroxyl compound added, (pbw) | | | | | | | | |
| 1,4-Butanediol | 9.0 | | | | 9.0 | | | |
| Triethylene glycol | | 9.0 | | | | | | |
| 1,5-Pentanediol | | | 9.0 | | | | | |
| 1,2-Propanediol | | | | 9.0 | | | | |
| Neopentyl glycol | | | | | | 9.4 | | |
| Trimethylolpropane | | | | | | | 9.4 | |
| Pentaerytritol | | | | | | | | 9.4 |
| Catalyst used, (pbw) | | | | | | | | |
| Lead Naphthenate (24% Pb) | 0.24 | | | | | | | |
| Zinc Neodecanoate (16% Zn) | | 0.12 | 0.18 | 0.18 | | | | |
| Dibutyltin dilaurate | | | | | 0.24 | 0.38 | 0.38 | 0.38 |
| Polyol Properties: | | | | | | | | |
| Viscosity, cps × $10^{-3}$ | 158 | 150 | 500 | 17.5 | 8.4 | 43.7 | 180 | 412 |
| Hydroxyl number | 503 | 518 | 512 | 636 | 478 | 495 | 507 | 538 |
| Water content, % | 0.78 | 1.74 | 1.78 | 1.90 | 0.12 | 0.17 | 0.27 | 0.56 |

*A phenol-paraformaldehyde (91%) mixture in a ratio of 1.6 moles formaldehyde per mole phenol.

TABLE V

| Example | 12 | 13 | 14 | 15 | 16 | 17 | 18 | 19 |
|---|---|---|---|---|---|---|---|---|
| Foam Formulation: (pbw) | | | | | | | | |
| Polyol | 100 | 100 | 100 | 100 | 100 | 100 | 100* | 100* |
| DC-193 | 3.0 | 3.0 | 3.0 | 3.0 | 3.0 | 3.0 | 3.0 | 3.0 |
| F-11A | 27.7 | 21.7 | 29.2 | 35.7 | 45.2 | 45.8 | 45.7 | 47.1 |
| DABCO R8020 | 0.5 | 0.5 | 0.5 | 0.5 | 0.2 | 0.5 | 0.5 | 0.5 |
| PAPI 135, Index | 120 | 120 | 100 | 100 | 120 | 120 | 120 | 120 |

TABLE V-continued

| Example | 12 | 13 | 14 | 15 | 16 | 17 | 18 | 19 |
|---|---|---|---|---|---|---|---|---|
| Foam Properties: | | | | | | | | |
| Density, pcf | 2.27 | 2.25 | 2.02 | 1.63 | 1.52 | 1.56 | 1.53 | 1.47 |
| Tumb. Friab., % weight charge | −4.0 | −4.9 | −8.2 | −9.6 | −4.6 | −4.4 | −3.9 | −13.6 |
| Butler Chimney, % weight retained | 85.9 | 84.9 | 80.1 | 66.4 | 73.0 | 75.2 | 69.9 | 53.8 |
| K-Factor, initial | 0.129 | 0.135 | 0.125 | 0.143 | 0.139 | 0.138 | 0.139 | 0.148 |
| 10% Compression Strength, psi | 53.2 | — | 17.6 | 10.3 | 21.9 | 25.3 | 26.1 | 12.0 |

*In addition, formulation contained 6 parts of propylene glycol.

EXAMPLES 20 and 21

The use of monohydroxyl compounds is shown in Examples 20 and 21, summarized in Table VI. The procedures and apparatus used were the same as that described in Example 1 except for the differences in reactants charged which is shown in the table. It should be noted that while the methanol charged in Example 20 is much higher (45 mole percent) than that used with other hydroxyl compounds, the effective concentration in the liquid reaction mixture is much smaller due to the volatility of the methanol. Analysis of such products (NMR and infrared spectroscopy) showed that only about one-fourth of the charged methanol reacted with the phenol/aldehyde condensate.

TABLE VI

| Example | 20 | 21 |
|---|---|---|
| Polyol Preparation: (pbw) | | |
| Phenol | 58.63 | 58.63 |
| Paraformaldehyde (91%) | 32.11 | 32.11 |
| Methanol | 9.02 | |
| 1-Butanol | | 9.02 |
| Dibutyltindilaurate | 0.24 | 0.24 |
| Polyol Properties: | | |
| Hydroxyl number | 415 | 396 |
| Viscosity, cps × 10$^{-3}$ | 96.8 | 52.5 |
| Water content, % | 0.54 | 0.57 |
| Foam formulation: (pbw) | | |
| Polyol | 100 | 100 |
| DC-193 | 3.0 | 3.0 |
| F-11A | 39.1 | 37.9 |
| POLYCAT 8 | 1.0 | 0.5 |
| LUPRANATE M20 (120 Index) | 129.6 | 124.6 |
| Foam Properties: | | |
| Density, pcf | 1.99 | 1.84 |
| Tunb. Friab., % wt. chg. | −7.9 | −20.1 |
| Butler Chimney, % wt. retained | 77.9 | 62.9 |
| K-Factor, initial | 0.126 | 0.143 |
| 10% Comp. Strength, psi | 37.4 | 31.9 |

EXAMPLES 22–26

The use of varied quantities of substituted-phenols is demonstrated in Examples 22 through 26 which are summaried in Table VII. The procedure followed is the same as that used in Example 1 except for differences in charge given in the Table.

TABLE VII

| Example | 22 | 23 | 24 | 25 | 26 |
|---|---|---|---|---|---|
| Polyol Preparation: (pbw) | | | | | |
| Phenol | 56.6 | 52.6 | 47.6 | 49.4 | 50.7 |
| p-Nonylphenol | 2.0 | 6.0 | 12.4 | | |
| p-Butylphenol | | | | 8.9 | |
| p-Cresol | | | | | 6.5 |
| Paraformaldehyde (91%) | 32.1 | 32.1 | 31.1 | 32.1 | 33.1 |
| 1,4-Butanediol | 9.0 | 9.0 | 8.7 | 9.2 | 9.3 |
| Lead naphthenate (24% Pb) | 0.24 | 0.24 | | | |
| Dibutyltin dilaurate | | | 0.23 | 0.36 | 0.37 |
| Polyol Properties: | | | | | |
| Viscosity, cps × 10$^{-3}$ | 216 | 95.2 | 57.6 | 12.2 | 7.0 |
| Hydroxyl number | 530 | 525 | 465 | 509 | 549 |
| Water content, % | 0.54 | 1.07 | 0.07 | 0.30 | 0.48 |
| Foam Formulation: (pbw) | | | | | |
| Polyol | 100 | 100 | 100 | 100 | 100 |
| Propylene glycol | 6.0 | 6.0 | — | — | — |
| DC-193 | 9.0 | 9.0 | 3.0 | 3.0 | 3.0 |
| DABCO R8020 | 0.5 | 0.5 | 0.5 | 0.5 | 0.5 |
| F-11A | 47.7 | 44.2 | 44.8 | 45.8 | 46.9 |
| PAPI 135, index | 120 | 120 | 120 | 120 | 120 |
| Foam Properties: | | | | | |
| Density, pcf | 1.75 | 1.73 | 1.63 | 1.45 | 1.40 |
| Tumb. Friab., % weight change | −3.9 | −1.7 | −7.5 | −3.3 | −2.6 |
| Butler Chimney, % weight retained | 64.5 | 68.4 | 48.7 | 58.5 | 53.7 |
| K-Factor, initial | 0.131 | 0.129 | 0.138 | 0.148 | 0.146 |
| 10% Compression Strength, psi | 30.3 | 34.2 | 23.4 | 23.9 | 20.9 |

EXAMPLES 27–33

The use of various catalysts for the preparation of the modified resole polyols of this invention are shown in Examples 27 through 33 which are summarized in Table VIII. Also shown are the properties of the polyurethane foams obtained from these polyols in the manner previously described using crude MDI (PAPS 135) at an index of 120.

TABLE VIII

| Examples | 27 | 28 | 29 | 30 | 31 | 32 | 33 |
|---|---|---|---|---|---|---|---|
| Polyol Preparation: (wt. % of charge) | | | | | | | |
| Phenol | 58.7 | 54.5 | 58.6 | 54.1 | 54.5 | 54.5 | 54.5 |
| p-Nonylphenol | — | 4.1 | — | 4.1 | 4.1 | 4.1 | 4.1 |
| 1,4-Butanediol | 9.0 | 9.0 | 9.0 | 9.0 | 9.0 | 9.0 | 9.0 |
| Paraformaldehyde (91%) | 32.1 | 32.1 | 32.1 | 31.9 | 32.1 | 32.1 | 32.1 |
| Zinc neodecanoate (16% Zn) | 0.045 | | | | | | |
| Lead naphthenate (24% Pb) | | 0.24 | | | | | |
| Dibutyltin dilaurate | | | 0.24 | | | | |
| Cobalt naphthenate (6% Co) | | | | 0.96 | | | |
| Tetrabutyl titanate | | | | | 1.24 | | |
| Tetraisopropyl titanate | | | | | | 0.24 | |
| Tetraoctyl titanate | | | | | | | 1.24 |
| Polyol Properties: | | | | | | | |
| Viscosity, cps × 10$^{-3}$ | 28 | 587 | 12 | 12 | * | 7 | 3 |
| Hydroxyl number | 559 | 507 | 504 | 560 | 417 | 454 | 428 |
| Water content, % | 1.8 | 0.28 | 0.22 | 0.32 | 0.22 | 0.63 | 0.48 |

TABLE VIII-continued

| Examples | 27 | 28 | 29 | 30 | 31 | 32 | 33 |
|---|---|---|---|---|---|---|---|
| Foam Properties: | | | | | | | |
| Density, pcf | 2.53 | 1.73 | 1.52 | 1.68 | — | 1.42 | 1.41 |
| Tumb. Friab., % weight change | −2.7 | −4.5 | −6.0 | −2.5 | −10.4 | −19.5 | −25.5 |
| Butler Chimney, % weight retained | 78.5 | 68.4 | 87.8 | 67.3 | 58.7 | 70.6 | 67.1 |
| K-Factor, initial | 0.127 | 0.119 | 0.146 | 0.144 | 0.146 | 0.141 | 0.142 |
| 10% Compression Strength, psi | 61.6 | 32.3 | 22.6 | 27.5 | 24.5 | 25.2 | 22.6 |

EXAMPLE 34

Analytical Comparison with Prior Art Products

In Example 2, the performance comparison was made between the product of this invention and that of U.S. Pat. No. 3,485,797. Since the latter product is made without added diol, a product produced by the process of this invention was carefully examined to determine the fate of diol used in the manufacture.

Phenol, paraformaldehyde (1.6 moles $CH_2O$/mole of phenol), and 1,4-butanediol (16 mole percent of phenol) were reacted in the presence of 0.24 percent of lead naphthenate solution (24 percent Pb) by heating the mixture at 110° C. to 117° C. for 3 hours under total reflux and then withdrawing the distillate. Over a 3 hour and 35 minute period while the temperature of this reaction mixture rose to 129° C., a total of 185.5 g of water was collected. Over the next 30 minutes, the pressure was reduced to strip off residual volatiles from the product. The final conditions were a product temperature of 95° C. and a pressure of <1 mm Hg. The weight of strippings collected was 59.2 g and the product weighted 1427.7 g. Thus, 1667.4 g out of a total charge of 1668 g was recovered in the three fractions.

Examination of the three fractions by a gas-liquid chromatographic procedure which had a butanediol detection limit of 0.02 percent (using spiked standards) showed no free butanediol in any of the fractions. Thus, all of the butanediol had reacted. Proton NMR spectra of a number of similarly produced resole polyols (using varied catalysts) showed clearly the presence of reacted butanediol moiety. Other structural features of the modified resole polyols shown by proton and $C^{13}$ NMR spectroscopy were predominent dibenzyl ether bridging compared to methylene bridging, low methylol phenol (mono cyclic) content, and predominently ortho ring substitution.

COMPARATIVE EXAMPLE B

Following the procedures of Example 1 and Example 3 of Great Britain No. 2,033,413, two phenolic resin polyols were prepared.

The first of these was the reaction of a 1.7 mole ratio of paraformaldehyde and phenol in the presence of a molar quantity (based on phenol) of diethylene glycol using potassium hydroxide catalysis followed by further reaction under acid conditions. The second preparation was a repeat of the first except for the use of a slightly lower (1.5) formaldehyde-phenol ratio and the use of 50 mole percent diethylene glycol and 50 mole percent glycerine (both based on phenol). The first product had a viscosity of 560 cps at 25° C. while the second product had a viscosity of 170 cps at 25° C.

Preparation of polyurethane foams from these two resins proved difficult. Using the formulations given in the reference, the first resin gave a foam which shrank while attempts to foam the second resin were unsuccessful.

An attempt was made to analyze the first resin by proton NMR. However, the resin contained such a high level of unreacted diethylene glycol that the diethylene glycol resonance obscured the spectrum in a critical region and little information on the resin structure could be obtained.

The preparation of the diethylene glycol modified resin was repeated except that the amount of glycol used was reduced from 44 percent of the charge (in the first preparation) to 9 percent (typical of the level used in the present invention). This resulted in a reduction in the amount of free glycol and gave a product having a viscosity of 3400 cps at 25° C.

Proton and $C^{13}$ NMR examination of the latter product showed the presence of unreacted diethylene glycol and no evidence for any reacted glycol as well as the absence of any dibenzyl ether, methylene bridging in both ortho and para positions of the phenol ring, high level of methylol phenol, and a very low multiple ring (>2) content. Thus, the product of Great Britain No. 2,033,413 not only contains a considerable amount of unreacted glycol but the basic structure and composition of the resin is different from the products of the present invention.

The embodiments of the invention in which an exclusive privilege or property is claimed are defined as follows:

1. A rigid cellular composition obtained by reacting, in the presence of a polymerization catalyst and a blowing agent, (1) an organic polyisocyanate with (2) a modified high ortho benzyllic ether-containing resole polyol; said polyol obtained by a process comprising reacting at 100° C. to 130° C. a mixture of
    (a) a phenol which is free of ortho substituents,
    (b) a molar excess relative to the phenol of a nonaqueous aldehyde having a formula RCHO where R is hydrogen, an alkyl group of 1 to 6 carbon atoms, or a halogenated alkyl group of 1 to 3 carbon atoms, and
    (c) from 1 to 50 mole percent relative to the phenol of an aliphatic hydroxyl compound having 1 to 4 hydroxyl groups, 1 to 12 carbon atoms, and 0 to 5 ether oxygen atoms,
in the presence of a catalytic amount of a metal derivative selected from the group consisting of (i) carboxylate salts of divalent ions of Mn, Zn, Cd, Mg, Co, Ni, Fe, Pb, Ca, Ba, and di($C_2$–$C_5$ alkyl)tin where the carboxylate ions each contains 1 to 20 carbon atoms, and (ii) ($C_nH_{2n+1}$)$_4$ TiO$_4$ where n is an integer of 3 to 8.

2. The composition of claim 1 wherein the polymerization catalyst is a polyurethane formation catalyst, the organic polyisocyanate, (1), is polymethylene polyphenylene polyisocyanate, and the amounts of (1) and (2) used are such that the ratio of isocyanate groups to hydroxyl groups is from 0.95:1 to 1.2:1.

3. The composition of claim 2 wherein the phenol component (a) is a mixture of phenol and 0 to 20 weight percent of a p-($C_1$–$C_{12}$ alkyl)phenol based on the weight of phenols.

4. The composition of claim 2 wherein the aliphatic hydroxyl compound, (c), is 1,4-butanediol.

* * * * *